United States Patent
Shinno et al.

(10) Patent No.: US 12,491,677 B2
(45) Date of Patent: Dec. 9, 2025

(54) SHEET MATERIAL AND FORMING METHOD

(71) Applicant: HONDA MOTOR CO., LTD., Tokyo (JP)

(72) Inventors: Yushi Shinno, Tokyo (JP); Daichi Tsunoda, Tokyo (JP); Shiori Abe, Tokyo (JP); Masahiko Nakayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 267 days.

(21) Appl. No.: 18/173,084

(22) Filed: Feb. 23, 2023

(65) Prior Publication Data

US 2023/0302716 A1 Sep. 28, 2023

(30) Foreign Application Priority Data

Mar. 23, 2022 (CN) .......................... 202210292768.5

(51) Int. Cl.
  *B29C 51/26* (2006.01)
  *B29C 51/10* (2006.01)
  *B29C 51/14* (2006.01)
  *B29C 51/36* (2006.01)

(52) U.S. Cl.
  CPC ............ *B29C 51/262* (2013.01); *B29C 51/10* (2013.01); *B29C 51/14* (2013.01); *B29C 51/36* (2013.01)

(58) Field of Classification Search
  None
  See application file for complete search history.

(56) References Cited

U.S. PATENT DOCUMENTS

| | | | |
|---|---|---|---|
| 2002/0155255 A1* | 10/2002 | Oguri | B32B 5/245 428/192 |
| 2019/0084213 A1* | 3/2019 | Arahata | B65H 45/22 |
| 2022/0063174 A1 | 3/2022 | Arahata et al. | |

FOREIGN PATENT DOCUMENTS

| | | |
|---|---|---|
| CN | 1799870 A | 7/2006 |
| CN | 108136658 A | 6/2018 |
| CN | 113226699 A | 8/2021 |
| JP | S63312249 A | 12/1988 |
| JP | 2000289135 A | 10/2000 |

(Continued)

OTHER PUBLICATIONS

Office Action issued Jul. 12, 2025 in the CN Patent Application No. 202210292768.5.

*Primary Examiner* — Abbas Rashid
*Assistant Examiner* — Adrianna K Konves
(74) *Attorney, Agent, or Firm* — CKC & Partners Co., LLC

(57) ABSTRACT

Provided are a sheet material in which a skin material can be adhered to a base material. A sheet material 2 for forming a design surface of a product by being adhered to base materials 68a, 68b includes a sheet-like skin material 20, and a sheet-like stretchable material 25 laminated on a rear surface side of the skin material 20 and having higher stretchability than the skin material 20. The stretchable material 25 has a rectangular shape in plan view, and include grippable areas 27a, 27b, 27c, 27d on which the skin material 20 is not laminated and which are respectively provided in portions including four edge sides 26a, 26b, 26c, 26d facing each other in plan view. In the skin material 20, five linear cut portions 24a, 24b, 24c, 24d, 24e are formed in a non-design area 23 other than the design areas 22a, 22b.

18 Claims, 6 Drawing Sheets

(56) References Cited

FOREIGN PATENT DOCUMENTS

| JP | 2018069651 | A  | 5/2018 |
|----|------------|----|--------|
| WO | 2020138340 | A1 | 7/2020 |

\* cited by examiner

SHEET MATERIAL AND FORMING METHOD

This application is based on and claims the benefit of priority from Chinese Patent Application No. 202210292768.5, filed on 23 Mar. 2022, the content of which is incorporated herein by reference.

BACKGROUND OF THE INVENTION

Field of the Invention

The present invention relates to a sheet material and a forming method. In particular, the present invention relates to a sheet material for forming a design surface of a product by being adhered to a base material having a three-dimensional shape, and a forming method for forming the product using the sheet material.

Related Art

A known method for forming a sheet material of a thermoplastic resin and forming a skin of an interior panel such as an instrument panel and a door trim for a vehicle includes heating a sheet material, stretching the heated sheet material, and using vacuum forming to adhere a base material of the interior panel to the sheet material (see PCT International Publication No. WO2020/138340 by the present applicant, for example).

In recent years, there has been proposed a design surface of an interior panel for a vehicle that is decorated with a leather material (a synthetic leather material, an artificial leather material (e.g., a suede material), a natural leather material (e.g., cowhide), and the like), a fibrous material (cloth, non-woven fabric, and the like), etc. However, the leather material or the fibrous material is adhered to the base material by means of manual operation by a person in many cases, which tends to lead to increases in manufacturing time and cost.

Patent Document 1: PCT International Publication No. WO2020/138340

SUMMARY OF THE INVENTION

It is conceivable to use a vacuum forming method as disclosed in PCT International Publication No. WO2020/138340 for adhering the above-described leather material or fibrous material to the base material.

FIG. 8 is a schematic diagram illustrating, in a side view, a process of adhering a suede material 100 to a surface of a base material 101 that protrudes upward by the forming method disclosed in PCT International Publication No. WO2020/138340. In the forming method, first, a gripping frame 102 for gripping an edge side of the suede material 100 is caused to approach a lower die 103 on which the base material 101 is placed (see the leftmost figure in FIG. 8). Next, an upper die 104 is caused to approach the lower die 103 (see the second figure from the left in FIG. 8), and then the lower die 103 and the upper die 104 are clamped together and air between the suede material 100 and the base material 101 is suctioned from a die surface of the lower die 103 to thereby adhere the suede material 100 to the base material 101 (see the rightmost figure in FIG. 8).

However, since the suede material 100 has lower stretchability and higher rigidity than a thermoplastic resin generally used as a sheet material in a vacuum forming process, rubbing takes places in portions 105a, 105b where a die surface of the upper die 104 comes into contact with the suede material 100 when the lower die 103 and the upper die 104 are clamped together, which may cause whitening of a surface of the suede material 100. In the vacuum forming, it is necessary to narrow the clearance between the die surface and the suede material 100 to secure airtightness, which may cause collapse of nap-raising when the lower die 103 and the upper die 104 are clamped together. In a portion stretched significantly, a base of the suede material may be exposed.

The present invention is directed at providing a sheet material enabling a skin material such as a leather material or a fibrous material to be adhered to a base material having a three-dimensional shape while maintaining aesthetic appearance of the skin material, and a forming method using the sheet material.

(1) A sheet material (e.g., a sheet material 2, described below) according to an aspect of the present invention includes: a sheet-like skin material (e.g., a skin material 20, described below) for forming a design surface of a product by being adhered to a base material (e.g., a base material 68a, 68b, described below) having a three-dimensional shape; and a sheet-like stretchable material (e.g., a stretchable material 25, described below) laminated on a rear surface side of the skin material and having higher stretchability than the skin material. The stretchable material includes grippable areas (e.g., grippable areas 27a, 27c, and grippable areas 27b, 27d, described below) on which the skin material is not laminated, the grippable areas being respectively provided in portions including at least two edge sides (e.g., edge sides 26a, 26c, and edge sides 26b, 26d, described below) facing each other in plan view.

(2) In this case, preferably, the stretchable material has a rectangular shape in plan view, and includes the grippable areas that are respectively provided in portions including four edge sides (e.g., the edge sides 26a, 26b, 26c, 26d, described below).

(3) In this case, preferably, the skin material includes a design area (e.g., a design area 22a, 22b, described below) for forming the design surface and a non-design area (e.g., a non-design area 23, described below) other than the design area, and at least one linear cut portion (e.g., a cut portion 24a, 24b, 24c, 24d, 24e, described below) is formed in the non-design area.

(4) In this case, preferably, the stretchable material has lower air permeability than the skin material.

(5) A forming method according to an aspect of the present invention is a method for forming a product using the sheet material (e.g., the sheet material 2, described below) according to any one of (1) to (4). The forming method includes: a disposing step of disposing a gripping device (e.g., a gripping device 3, described below) that grips the sheet material at at least a pair of the grippable areas facing each other in plan view between a lower die (e.g., a lower die 60, described below) on which the base material is placed and an upper die (e.g., an upper die 61, described below) that is movable upward and downward relative to the lower die (e.g., a disposing step S3, described below); an approaching step of causing the gripping device to approach the lower die to bring the stretchable material into contact with the base material (e.g., an approaching step S4, described below); and a forming step of clamping the lower die and the upper die together (e.g., a forming step S5, described below).

(6) A forming method according to an aspect of the present invention is a method for forming a product using the sheet material (e.g., the sheet material 2, described below) according to any one of (2) to (4). The forming method includes: a disposing step of disposing a gripping device (e.g., the gripping device 3, described below) that grips the sheet material at two pairs of the grippable areas facing each other in plan view between a lower die (e.g., the lower die 60, described below) on which the base material is placed and an upper die (e.g., the upper die 61, described below) that is movable upward and downward relative to the lower die (e.g., the disposing step S3, described below); an approaching step of causing the gripping device to approach the lower die to bring the stretchable material into contact with the base material (e.g., the approaching step S4, described below); and a forming step of clamping the lower die and the upper die together (e.g., the forming step S5, described below).

(7) A forming method according to an aspect of the present invention is a method for forming a product using the sheet material (e.g., the sheet material 2, described below) according to (3) or (4), the forming method including: a disposing step of disposing a gripping device (e.g., the gripping device 30, described below) that grips the sheet material at at least a pair of the grippable areas facing each other in plan view between a lower die (e.g., the lower die 60, described below) on which the base material is placed and an upper die (e.g., the upper die 61, described below) that is movable move upward and downward relative to the lower die (e.g., the disposing step S3, described below); an approaching step of causing the gripping device to approach the lower die to bring the stretchable material into contact with the base material (e.g., the approaching step S4, described below); and a forming step of clamping the lower die and the upper die together (e.g., the forming step S5, described below). The disposing step includes disposing the gripping device at such a position that causes, after the approaching step and the forming step, the cut portion to open on a portion of the lower die where the base material is not placed.

(8) A forming method according to an aspect of the present invention is a method for forming a product using the sheet material (e.g., the sheet material 2, described below) according to (4). The forming method includes: a disposing step of disposing a gripping device (e.g., the gripping device 3, described below) that grips the sheet material at at least a pair of the grippable areas facing each other in plan view between a lower die (e.g., the lower die 60, described below) on which the base material is placed and an upper die (e.g., the upper die 61, described below) that is movable upward and downward relative to the lower die (e.g., the disposing step S3, described below); an approaching step of causing the gripping device to approach the lower die to bring the stretchable material into contact with the base material (e.g., the approaching step S4, described below); and a vacuum forming step of suctioning air between die a surface of the lower die and a die surface of the upper die while clamping the lower die and the upper die together (e.g., the forming step S5, described below).

(1) The sheet material according to the present invention includes the sheet-like skin material, and the sheet-like stretchable material laminated on the rear surface side of the skin material and having higher stretchability than the skin material. The stretchable material includes the grippable areas on which the skin material is not laminated and which are respectively provided in portions including at least two edge sides facing each other in plan view. Due to this feature, gripping the sheet material at at least two grippable areas facing each other to apply tension between these grippable areas enables the sheet material to be adhered to the base material having a three-dimensional shape while stretching the stretchable material without applying a large load to the skin material, whereby the sheet material can be adhered to the front surface of the base material while maintaining the aesthetic appearance of the skin material. According to the present invention, laminating the stretchable material having higher stretchability than the skin material on the rear surface of the skin material makes it possible to uniformly stretch the skin material, thereby enabling prevention of exposure of the base of the skin material.

(2) In the present invention, the stretchable material has a rectangular shape in plan view, and includes the grippable areas, on which the skin material is not laminated, in portions including the four edge sides. Due to this feature, the portions including the two pairs of edge sides facing each other of the rectangular stretchable material, that is, the entire perimeter of the stretchable material can function as the grippable areas. According to the present invention, gripping the sheet material at the grippable areas of the entire perimeter of the stretchable material to apply tension between the grippable areas makes it possible to uniformly stretch the stretchable material in all directions when the sheet material is to be adhered to the base materials. According to the present invention, the sheet material can be adhered to the base material having a three-dimensional shape while maintaining the aesthetic appearance of the skin material.

(3) In the present invention, the skin material includes the design area that forms the design surface when adhered to the base material and the non-design area other than the design area, and at least one linear cut portion is formed in the non-design area. This feature makes it possible to allow the skin material in the non-design area (i.e., a portion to be cut off later) to stretch while suppressing stretch of the skin material in the design area when the sheet material is to be adhered to the base materials, thereby enabling the sheet material to be adhered to the base material having a three-dimensional shape while maintaining the aesthetic appearance of the skin material.

(4) In the present invention, the stretchable material has lower air permeability than the skin material. Due to this feature, the air tightness between the stretchable material and the base material can be improved, thereby enabling vacuum forming to be used to adhere the sheet material to the base material.

(5) In the forming method according to the present invention, the sheet material is adhered to the base material by way of the disposing step of disposing, between the lower die and the upper die, the gripping device by which the sheet material is gripped, the approaching step of causing the gripping device to approach the lower die, and the forming step of clamping the lower die and the upper die together. In the present invention, the sheet material is used which has a multilayer structure in which the skin material and the stretchable material are laminated as described above and in which at least two grippable areas facing each other are formed in the stretchable material. In the disposing step and the approaching step, the sheet material is brought into contact with the base material while being gripped at at least two grippable areas facing each other by the gripping device, thereby enabling the sheet material to be adhered to the front surface of the base material while maintaining the aesthetic appearance of the skin material without applying a large load to the skin material as described above.

(6) In the forming method according to the present invention, the sheet material is used which has a multilayer structure in which the skin material and the stretchable material are laminated as described above and in which the grippable areas are provided respectively in portions including the four edge sides of the rectangular shape in plan view. In the disposing step and the approaching step, the sheet material is brought into contact with the base material while being gripped at the grippable areas provided on the entire perimeter of the stretchable material by the gripping device, enabling the stretchable material to be uniformly stretched in all directions, whereby the sheet material can be adhered to the front surface of the base material while maintaining the aesthetic appearance of the skin material.

(7) In the forming method according to the present invention, the sheet material is adhered to the base materials by way of the disposing step of disposing, between the lower die and the upper die, the gripping device by which the sheet material is gripped at at least two grippable areas facing each other, the approaching step of causing the gripping device to approach the lower die, and the forming step of clamping the lower die and the upper die together. In the present invention, the sheet material is used in which at least one linear cut portion is formed in the non-design area of the skin material. In the disposing step, the gripping device is disposed at such a position that causes, after the approaching step and the forming step, the cut portions to open on a portion of the lower die where the base material is not placed. This feature makes it possible to allow the skin material to stretch in the non-design area while suppressing stretch of the skin material in the design area when the sheet material is to be adhered to the base material, thereby enabling the sheet material to be adhered to the base material having a three-dimensional shape while maintaining the aesthetic appearance of the skin material.

(8) In the forming method according to the present invention, the sheet material is adhered to the base materials by way of the disposing step of disposing, between the lower die and the upper die, the gripping device by which the sheet material is gripped at at least two grippable areas facing each other, the approaching step of causing the gripping device to approach the lower die, and the vacuum forming step of suctioning air between the die surface of the lower die and the die surface of the upper die while clamping the lower die and the upper die together. In the present invention, in the sheet material, the stretchable material has lower air permeability than the skin material. Due to this feature, in the vacuum forming step, the stretchable material and the base material can be in close contact with each other by suctioning air between the die surface of the lower die and the die surface of the upper die, whereby the sheet material can be uniformly adhered to the front surface of the base material having a three-dimensional shape.

DETAILED DESCRIPTION OF THE INVENTION

A sheet material and a forming method using the sheet material according to an embodiment of the present invention will be described below with reference to the drawings.

Figure 1:
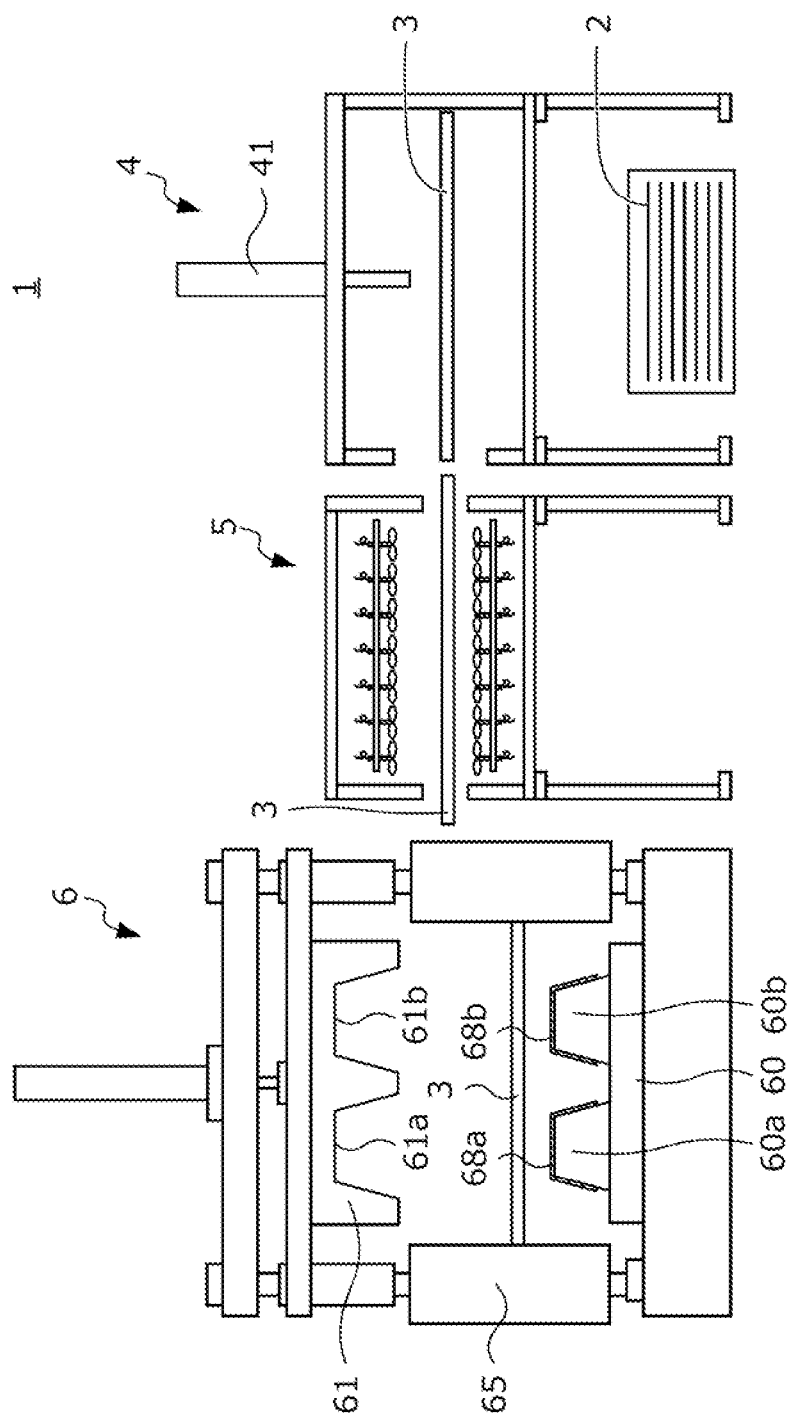
FIG. 1 is a diagram schematically illustrating a configuration of a forming system in which a sheet material and a forming method according to an embodiment of the present invention are used.

FIG. 1 is a diagram schematically illustrating a configuration of a forming system 1 in which a sheet material 2 and a forming method according to the present embodiment are used. The forming system 1 and the forming method using the forming system 1 is a device and a method for manufacturing a product by forming the sheet material 2 and adhering the sheet material 2 as a skin to a base material of an interior panel such as an instrument panel and a door trim for a vehicle, the skin forming a design surface of the interior panel.

The forming system 1 includes a gripping device 3 for gripping the sheet material 2 and stretching and bending the sheet material 2, a sheet supplying unit 4 for supplying the gripping device 3 with a new sheet material 2, a heating device 5 for heating and softening the sheet material 2 gripped by the gripping device 3, and a forming device 6 for vacuum forming the sheet material 2 softened via heat via the heating device 5.

The gripping device 3 grips the sheet material 2 supplied by the sheet supplying unit 4, and sequentially moves to the heating device 5 and then the forming device 6 while gripping the sheet material 2. In the forming device 6, the sheet material 2 gripped by the gripping device 3 is vacuum-formed, whereby the sheet material 2 is adhered as a skin to base materials 68a, 68b, described below. The gripping device 3 returns to the sheet supplying unit 4 after the process in the forming device 6 is completed.

The sheet supplying unit 4 includes a sheet transfer mechanism 41 for gripping one sheet of the sheet materials 2 stacked at the lower portion of the sheet supplying unit 4 and passing the sheet to the gripping device 3.

The forming device 6 includes a lower die 60, an upper die 61 provided vertically above the lower die 60 to sandwich the gripping device 3 and the sheet material 2 gripped by the gripping device 3, and a lowering device 65 for lowering the gripping device 3 toward the lower die 60 side along the vertical direction between the lower die 60 and the upper die 61 and causing the sheet material 2 gripped by the gripping device 3 to approach the lower die 60.

The lower die 60 is formed with a first lower die surface 60a and a second lower die surface 60b. The first lower die surface 60a and the second lower die surface 60b protrude upward in a side view and have the same shape. Two first base material 68a and second base material 68b cut and separated from each other in advance are placed on the lower die surfaces 60a, 60b, respectively. The first base material 68a and the second base material 68b each have a three-dimensional shape. More specifically, the base materials 68a, 68b protrude upward in a side view and have the same shape. A suction device, not-illustrated, is connected to the lower die surfaces 60a, 60b, enabling air to be suctioned from the lower die surfaces 60a, 60b.

A first upper die surface 61a and a second upper die surface 61b in the upper die 61 are formed at respective positions facing the lower die surface 60a and the second lower die surface 60b along the vertical direction. The first upper die surface 61a and the second upper die surface 61b protrude downward in a side view and have the same shape. Also, a suction device, not illustrated, is connected to the upper die surfaces 61a, 61b, enabling air to be suctioned from the upper die surfaces 61a, 61b.

In the forming device 6, after the gripping device 3 is lowered toward the lower die 60 side by the lowering device 65, and the sheet material 2 gripped by the gripping device 3 comes into contact with the base materials 68a, 68b, the lower die 60 and the upper 61 are clamped together, and air is suctioned from the lower die surfaces 60a, 60b and the upper die surfaces 61a, 61b, which makes it possible to adhere the sheet material 2 to the two base materials 68a, 68b.

In the present embodiment described above, one sheet material 2 is adhered to the two base materials 68a, 68b by the forming device 6 to thereby simultaneously form two products having the same shape. However, the present invention is not limited to this configuration. The present invention is also applicable to a case where one sheet material 2 is adhered to one or three or more base materials.

Figure 2:
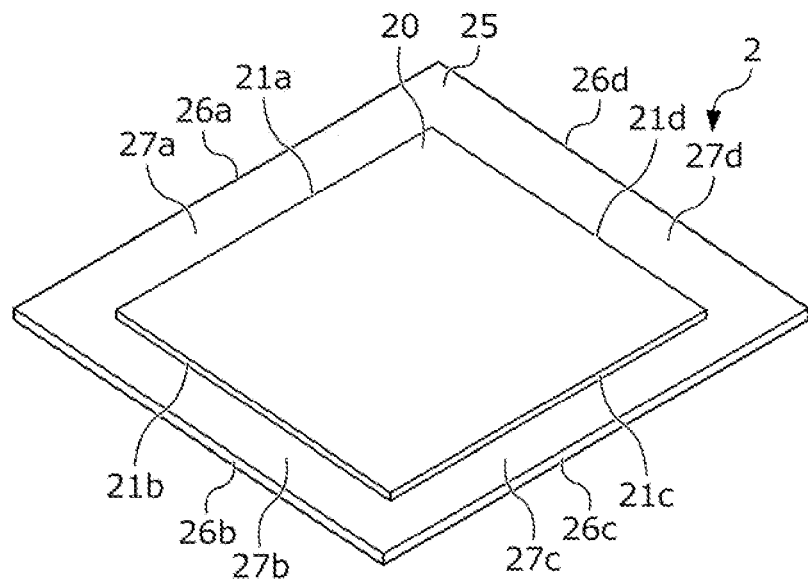
FIG. 2 is a perspective view of the sheet material.

FIG. 2 is a perspective view of the sheet material 2. More specifically, FIG. 2 is a perspective view of the sheet material 2 viewed from a front surface side (i.e., a surface side forming a design surface in the product in which the sheet material 2 is adhered to the base materials 68a, 68b) of the sheet material 2.

The sheet material 2 is sheet-like, and has a rectangular shape in plan view. More specifically, the sheet material 2 is a sheet-like laminate including a sheet-like skin material 20, and a sheet-like stretchable material 25 laminated on a rear surface side of the skin material 20 and having higher stretchability than the skin material 20.

The skin material 20 has a rectangular shape in plan view. The skin material 20 forms a front surface in the sheet material 2. In other words, the skin material 20 forms a design surface in the product manufactured by adhering the rear surface of the sheet material 2 to the base materials 68a, 68b. As the skin material 20, a material having lower stretchability than a thermoplastic resin material generally used in vacuum forming is employed, and examples of the material include a leather material such as a synthetic leather material, an artificial leather material (e.g., a suede material), and a natural leather material (e.g., cowhide), and a fibrous material (e.g., cloth, non-woven fabric, and the like). In the present embodiment, as the skin material 20, the suede material having particularly high air permeability in the leather materials is used. However, the present invention is not limited to this configuration.

The stretchable material 25 has a rectangular shape in plan view, and has slightly larger surface area than the skin material 20 as illustrated in FIG. 2. The stretchable material 25 forms a rear surface in the sheet material 2. As the stretchable material 25, a sheet-like material having at least higher stretchability than the skin material 20 is employed, and examples of the material include a film, a foamed body, and rubber. In the present embodiment, a polypropylene foamed body exhibiting higher stretchability than the leather material, the fibrous material and the like listed as the material that can be used for the skin material 20 is used as the stretchable material 25. However, the present invention is not limited to this configuration. In order to secure airtightness in the vacuum forming, the stretchable material 25 having at least lower air permeability than the skin material 20 is preferably used, for example, in the case where the suede material, the fibrous material, or the like having particularly high air permeability is used as the skin material 20.

The stretchable material 25 is adhered to the rear surface side of the skin material 20 by an adhesive, for example. Preferably, the adhesive is used which is made of a material having such stretchability that the skin material 20 can follow a stretch of the stretchable material 25. More specifically, an acrylic adhesive material, reactive urethane hot melt, or the like is used as the material of the adhesive. Note that in the present embodiment, the stretchable material 25 and the skin material 20 are bonded to each other through the adhesive. However, adhering means for adhering the stretchable material 25 to the skin material 20 is not limited to the adhesive. The stretchable material 25 may be adhered to the skin material 20 by known means suitable for the materials used for the stretchable material 25 and the skin material 20. Specifically, the stretchable material 25 may be adhered to the skin material 20 by, for example, frame lamination, that is, by melting a sheet-like soft urethane foamed body interposed between the stretchable material 25 and the skin material 20.

As described above, the stretchable material 25 has a surface area slightly larger than the skin material 20. In other words, four edge sides 26a, 26b, 26c, 26d of the stretchable material 25 are slightly longer than four edge sides 21a, 21b, 21c, 21d of the skin material 20, respectively. In this manner, as illustrated in FIG. 2, in the stretchable material 25, four edge portions including the four edge sides 26a, 26b, 26c, 26d of the stretchable material 25 having a rectangular shape in plan view is formed with grippable areas 27a, 27b, 27c, 27d on which the skin material 20 is not laminated. In other words, in the sheet material 2 having a multilayer structure including a layer of the skin material 20 and a layer of the stretchable material 25, the grippable areas 27a, 27b, 27c, 27d which are areas including no layer of the skin material 20 are formed in all the edge portions of the sheet material 2 along the four edge sides 26a, 26b, 26c, 26d of the sheet material 2.

Note that in the present embodiment, the grippable areas 27a, 27b, 27c, 27d as areas including no layer of the skin material 20 as described above are formed along all the edge sides 26a, 26b, 26c, 26d of the stretchable material 25 having a rectangular shape. However, the present invention is not limited to this configuration. Such grippable areas may be formed along at least two edge sides (i.e., the edge sides 26a, 26c or the edge sides 26b, 26d) facing each other in plan view in the stretchable material 25.

Figure 3:
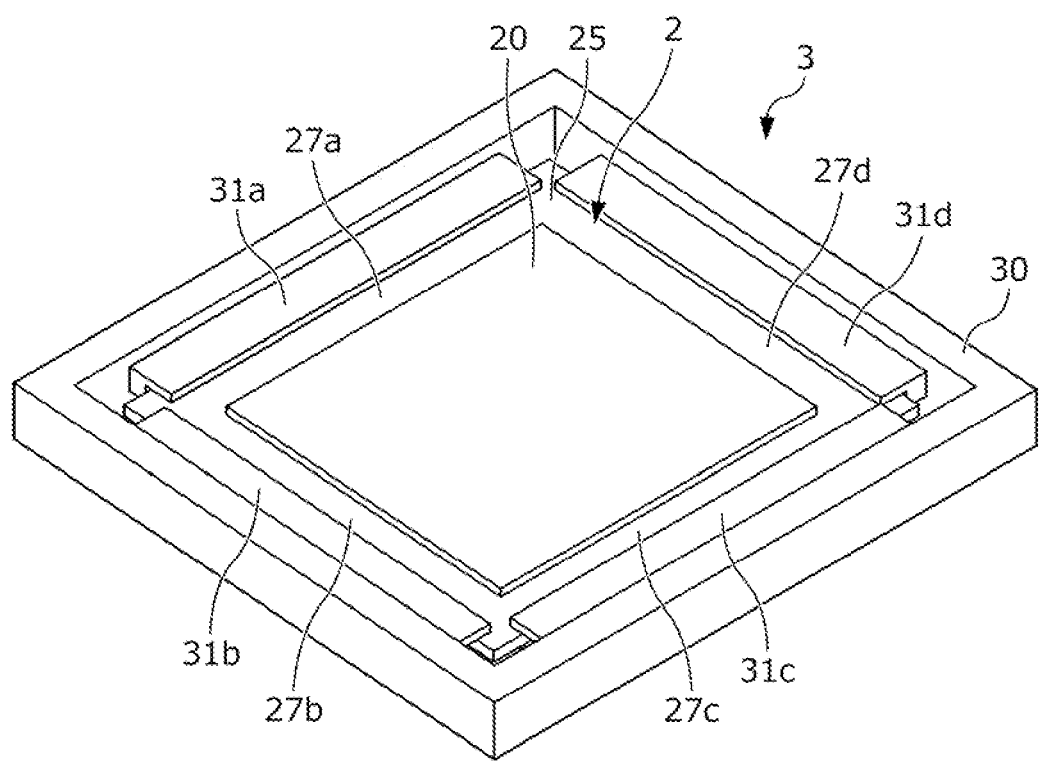
FIG. 3 is a perspective view of the sheet material and a gripping device for gripping the sheet material.

FIG. 3 is a perspective view of the sheet material 2 and the gripping device 3 for gripping the sheet material 2. The gripping device 3 includes a gripping frame 30 having a rectangular frame-like shape in plan view to surround a perimetrical edge of the sheet material 2, and four clamps 31a, 31b, 31c, 31d provided in respective four inner perimetrical portions of the gripping frame 30. The four clamps 31a, 31b, 31c, 31d have a belt-like shape extending along the four grippable areas 27a, 27b, 27c, 27d of the stretchable material 25, respectively. The four clamps 31a, 31b, 31c, 31d grip the four grippable areas 27a, 27b, 27c, 27d of the sheet material 2, respectively.

In this way, in the present invention, only the grippable areas 27a, 27b, 27c, 27d on which the skin material 20 is not laminated as described above in the sheet material 2 are gripped by the clamps 31a, 31b, 31c, 31d of the gripping device 3, which makes it possible to allow a stretch of the stretchable material 25 while suppressing an excessive stretch of the skin material 20, when the sheet material 2 is adhered to the base materials 68a, 68b having a three-dimensional shape.

Figure 4:
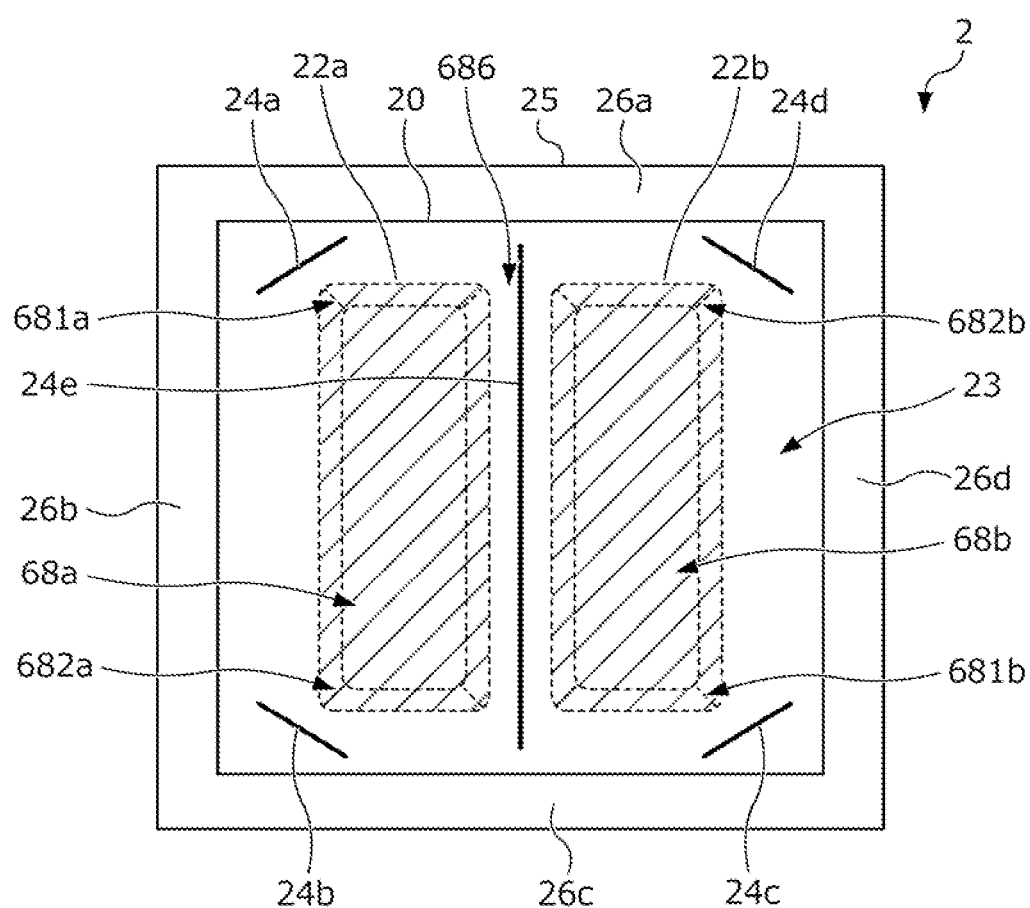
FIG. 4 is a plan view of the sheet material.

FIG. 4 is a plan view of the sheet material 2. Note that in FIG. 4, the base materials 68a, 68b each are illustrated with a dashed line, which are present on the vertical direction lower side of the sheet material 2 when the gripping device 3 for gripping the sheet material 2 is disposed between the lower die 60 and the upper die 61. Also, in FIG. 4, design areas 22a, 22b are illustrated by hatching, each of which is a portion in the sheet material 2 to be adhered to each of the base materials 68a, 68b, that is, a portion in the skin material 20 forming a design surface in a product when the gripping device 3 is lowered toward the lower die 60 side, and then the lower die 60 and the upper die 61 are clamped together. In the skin material 20, an area other than the design areas 22a, 22b, that is, a portion which is cut off to provide a product after adhering the sheet material 2 to the base materials 68a, 68b is referred to as a non-design area 23.

As illustrated by a thick solid line in FIG. 4, in the skin material 20, at least one (five in an example of FIG. 4) of linear cut portions 24a, 24b, 24c, 24d, 24e is formed in the non-design area 23 other than the design areas 22a, 22b. Note that it is preferable that the cut portions 24a to 24e are formed only in the skin material 20 of the sheet material 2 formed by laminating the skin material 20 and the stretchable material 25 and are not formed in the stretchable material 25. The depths of the cut portions 24a to 24e do not necessarily reach the rear surface side of the skin material 20. Alternatively, the cut portions 24a to 24e may have a continuous slit shape or an intermittently perforated form.

The cut portions 24a to 24e are formed to intersect the stretching direction of the skin material 20, in a portion in which a particularly large stretch is generated when the lower die 60 and the upper die 61 are clamped together, in the non-design area 23 of the skin material 20.

For example, the first cut portion 24a, the second cut portion 24b, the third cut portion 24c, and the fourth cut portion 24d are formed at respective portions slightly outward from corners 681a, 682a, 681b, 682b of the base materials 68a, 68b that protrude toward the sheet material 2 side in a sectional view, in the non-design area 23.

Figure 5:
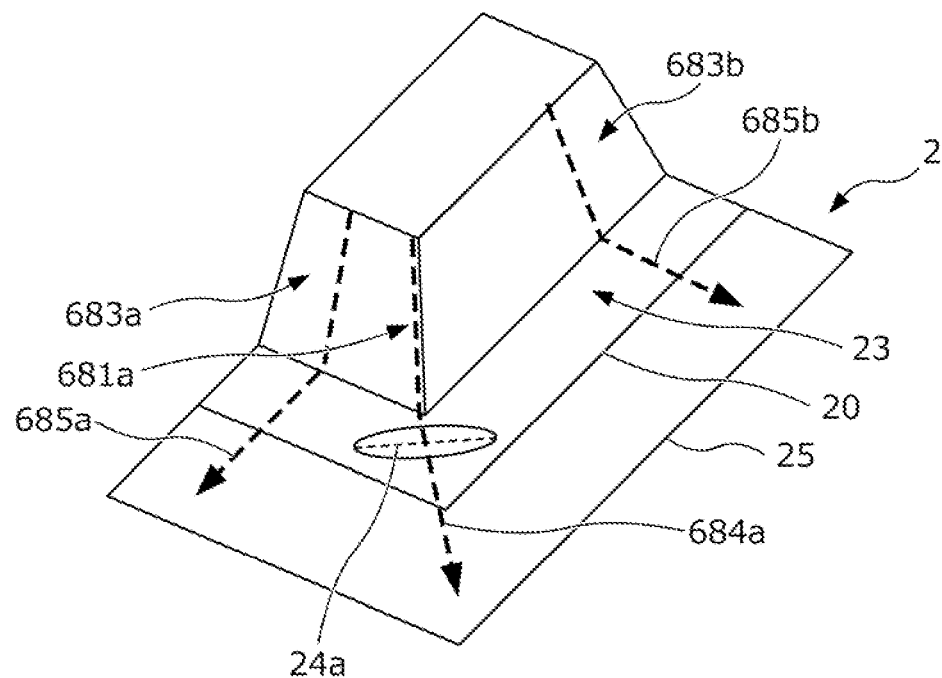
FIG. 5 is a diagram schematically illustrating stretches generated in the sheet material when a lower die and an upper die are clamped together and the sheet material 2 is adhered to the base material.

FIG. 5 is a diagram schematically illustrating stretches generated in the sheet material 2 when the lower die 60 and the upper die 61 are clamped together and the sheet material 2 is adhered to the base material 68a. Note that FIG. 5 illustrates only the vicinity of the corner 681a.

As illustrated in FIG. 5, at the corner 681a formed at a portion where two side walls 683a, 683b intersect each other in the base material 68a, the perimetrical length of the corner 681a is longer than that of each of the side walls 683a, 683b. Accordingly, a stretch 684a generated along the corner 681a when the dies are clamped together is longer than each of stretches 685a, 685b generated along the respective side walls 683a, 683b. As illustrated by dashed lines in FIG. 5, the first cut portion 24a is formed in advance to be perpendicular to the stretching direction of the stretch 684a, at a position slightly outward from the corner 681a in which a particularly larger stretch than the surroundings is generated when the dies are clamped together, in the non-design area 23 of the skin material 20, thereby enabling the first cut portion 24a to be opened along the stretching direction when the dies are clamped together. This can suppress an excessive stretch at a portion in the skin material 20 adhered to the corner 681a when the dies are clamped together.

Note that though drawings and a detailed description are omitted, the second cut portion 24b, the third cut portion 24c, and the fourth cut portion 24d are formed in the non-design area 23 of the skin material 20, which makes it possible to suppress an excessive stretch at a portion in the skin material 20 adhered to each of the corners 682a, 681b, 682b when the dies are clamped together, for the same reason as the first cut portion 24a.

Returning to FIG. 4, for example, a fifth cut portion 24e is formed in a valley 686 between the two base materials 68a, 68b that protrude toward the sheet material 2 side in a sectional view, in the non-design area 23.

Figure 6:
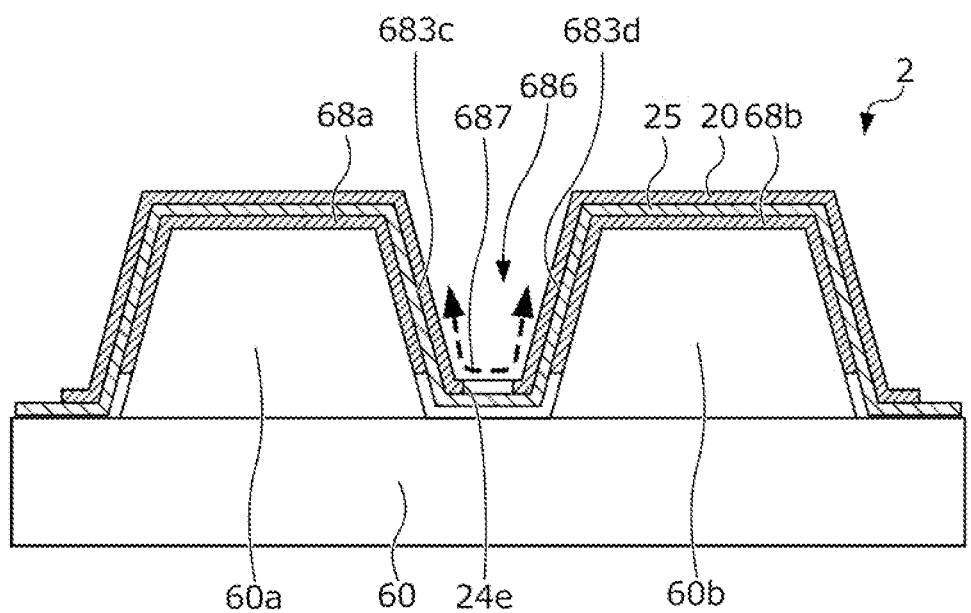
FIG. 6 is a diagram schematically illustrating a stretch generated in the sheet material when the lower die and the upper die are clamped together and the sheet material 2 is adhered to the base material.

FIG. 6 is a diagram schematically illustrating a stretch generated in the sheet material 2 when the lower die 60 and the upper die 61 are clamped together and the sheet material 2 is adhered to the base materials 68a, 68b. Note that FIG. 6 illustrates a cross-sectional view along a surface perpendicular to the extending direction of the valley 686.

As illustrated in FIG. 6, in the valley 686, a stretch 687 is generated along a direction perpendicular to the extending direction of the valley 686. Since the valley 686 is formed between two side walls 683c, 683d, the stretch 687 generated in the valley 686 when the dies are clamped together is longer than each of the stretches 685a, 685b generated along the two side walls 683a, 683b as illustrated in FIG. 5, for example. Accordingly, in the valley 686 in which a particularly larger stretch than the surroundings is generated when the dies are clamped together, in the non-design area 23 of the skin material 20, the fifth cut portion 24e is formed, in advance, along the extending direction of the valley 686 to be perpendicular to the stretch 687, enabling the fifth cut portion 24e to be opened along the stretching direction when the dies are clamped together. This can suppress an excessive stretch at portions in the skin material 20 adhered to the side walls 683c, 683d when the dies are clamped together.

Next, the process of the forming method for forming a product using the sheet material 2 and the forming system 1 described above will be described.

Figure 7:
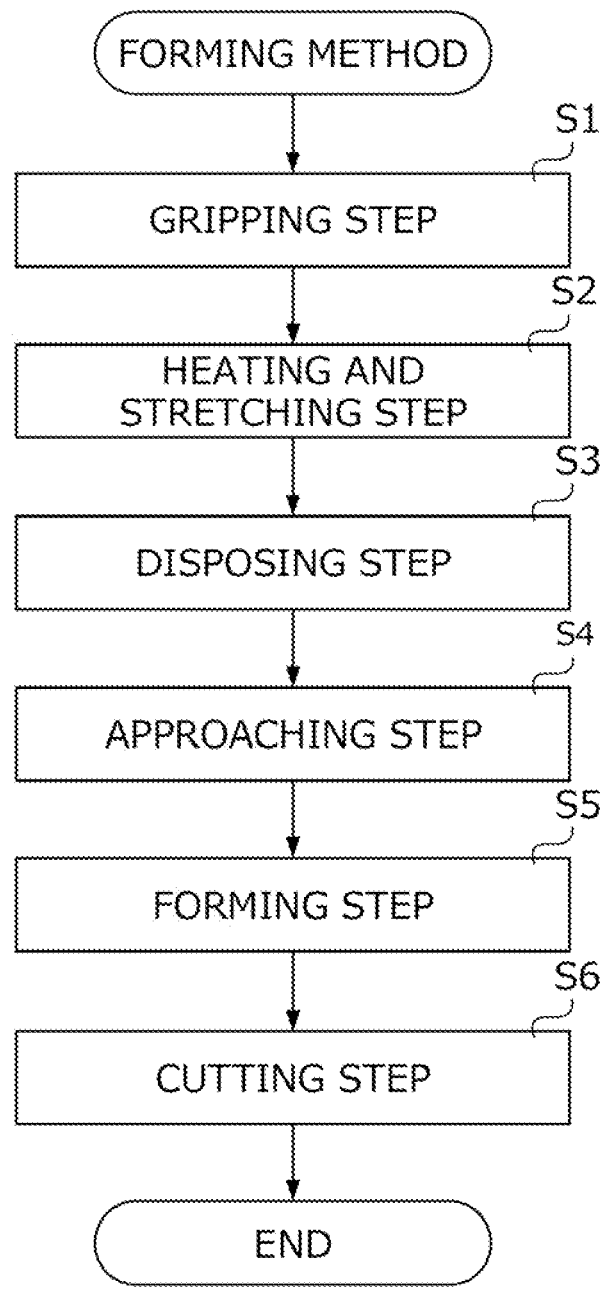
FIG. 7 is a flowchart illustrating a detailed process of the forming method.
Figure 8:
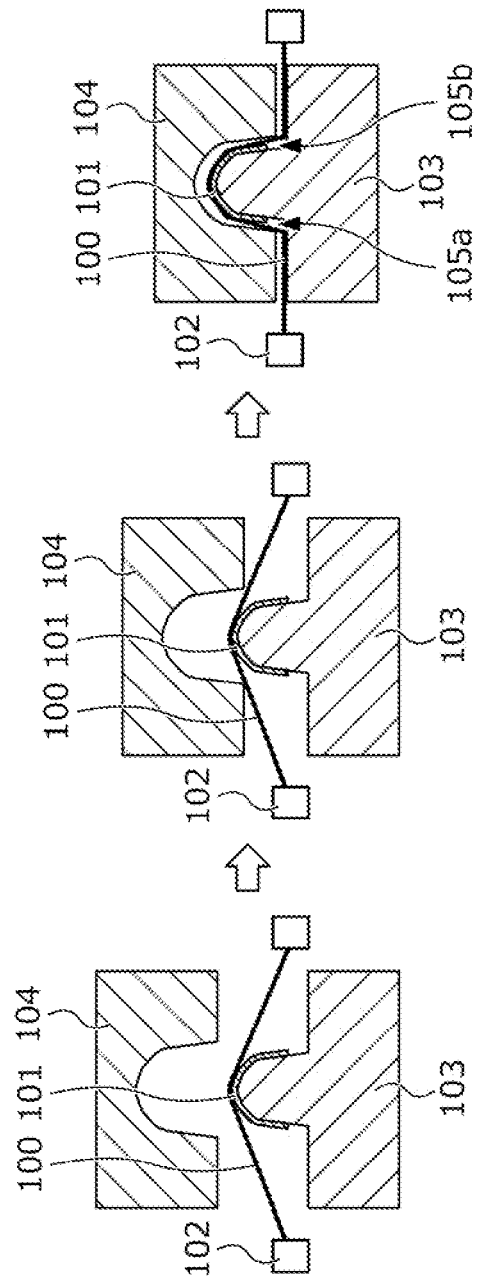
FIG. 8 is a diagram schematically illustrating a process of adhering a suede material to a front surface of the base material by a forming method disclosed in Patent Document 1.

FIG. 7 is a flowchart illustrating a detailed process of the forming method according to the present embodiment. First, in a gripping step S1, the sheet supplying unit 4 uses the sheet transfer mechanism 41 to make the gripping frame 30 of the gripping device 3 grip one new sheet of the sheet material 2 and then conveys the gripping device 3 to the heating device 5. More specifically, as illustrated in FIG. 3, the two pairs of grippable areas 27a, 27c and grippable areas 27b, 27d facing each other in plan view in the sheet material 2 are gripped by the two pairs of clamps 31a, 31c and clamps 31b, 31d provided in the gripping frame 30. Hereinafter, there will be described the case where the two pairs of grippable areas 27a, 27c and grippable areas 27b, 27d of the sheet material 2 are gripped by the gripping device 3. However, the present invention is not limited to this configuration. The portions in the sheet material 2 to be gripped by the gripping device 3 may be at least any of the two pairs of grippable areas 27a, 27c and grippable areas 27b, 27d.

Next, in a heating and stretching step S2, the heating device 5 heats and softens the sheet material 2 gripped by the gripping frame 30 of the gripping device 3. Note that in the heating and stretching step S2, the sheet material 2 may be heated and stretched in any direction.

Next, in a disposing step S3, the gripping device 3 that grips the sheet material 2 after the heating and stretching step S2 is set to the lowering device 65, and is disposed between the lower die 60 on which the base materials 68a, 68b are placed and the upper die 61. Note that in the disposing step S3, the gripping device 3 is disposed so that the sheet material 2 is disposed at a position as illustrated in FIG. 4 relative to the base materials 68a, 68b. In other words, in the disposing step S3, after an approaching step S4 and a forming step S5 described below, the gripping device 3 is disposed at such a position that causes the cut portions 24a to 24e to open on a portion of the lower die 60 where the base materials 68a, 68b are not placed.

Next, in the approaching step S4, the lowering device 65 is used to cause the gripping device 3 for gripping the sheet material 2 to approach the lower die 60 at a position described above, and to bring the rear surface side (i.e., the stretchable material 25) of the sheet material 2 into contact with the base materials 68a, 68b placed on the lower die 60. Also, in the approaching step S4, after the rear surface side of the sheet material 2 comes into contact with the base materials 68a, 69b, the gripping device 3 is further lowered to stretch the sheet material 2.

Next, in the forming step S5, a product is manufactured by suctioning air between the lower die surfaces 60a, 60b and the upper die surfaces 61a, 61b from the lower die surfaces 60a, 60b and the upper die surfaces 61a, 61b while the lower die 60 and the upper die 61 are clamped together, and adhering the design areas 22a, 22b of the sheet material 2 as skins to the base materials 68a, 68b.

Next, in a cutting step S6, the sheet material 2 is cut into a first product portion in which the base material 68a is adhered to the design area 22a and a second product portion in which the base material 68b is adhered to the design area 22b, by cutting the sheet material 2 along the valley 68b with a trim blade not illustrated.

According to the sheet material 2 and the forming method according to the present embodiment, the following effects can be achieved.

(1) The sheet material 2 includes the sheet-like skin material 20, and the sheet-like stretchable material 25 laminated on the rear surface side of the skin material 20 and having higher stretchability than the skin material 20. The stretchable material 25 includes the grippable areas 27a, 27c and the grippable areas 27b, 27d on which the skin material 20 is not laminated and which are respectively provided in portions including at least two edge sides 26a, 26c facing each other and edge sides 26b, 26d facing each other in plan view. Therefore, according to the sheet material 2, at least two grippable areas 27a, 27c facing each other and grippable areas 27b, 27d facing each other are gripped and tension is applied between these grippable areas 27a to 27d, enabling the sheet material 2 to be adhered to the base materials 68a, 68b having a three-dimensional shape while stretching the stretchable material 25 without applying a large load to the skin material 20, whereby the sheet material 2 can be adhered to the front surfaces of the base materials 68a, 68b while maintaining the aesthetic appearance of the skin material 20. According to the present embodiment, laminating the stretchable material 25 having higher stretchability than the skin material 20 on the rear surface of the skin material 20 makes it possible to uniformly stretch the skin material 20, thereby enabling prevention of exposure of the base of the skin material 20.

(2) In the present embodiment, the stretchable material 25 has a rectangular shape in plan view, and includes the grippable areas 27a to 27d, on which the skin material 20 is not laminated, in portions including the four edge sides 26a to 26d. Due to this feature, the portions including the two pairs of edge sides 26a, 26c facing each other and edge sides 26b, 26d facing each other of the rectangular stretchable material 25, that is, the entire perimeter of the stretchable material 25 can function as the grippable areas 27a to 27d. According to the present embodiment, gripping the sheet material 25 at the grippable areas 27a to 27d of the entire perimeter of the stretchable material 25 to apply tension between the grippable areas 27a to 27d makes it possible to uniformly stretch the stretchable material 25 in all directions when the sheet material 2 is to be adhered to the base materials 68a, 68b. According to the present embodiment, the sheet material 2 can be adhered to the base materials 68a, 68b having a three-dimensional shape while maintaining the aesthetic appearance of the skin material 20.

(3) In the present embodiment, in the skin material 20 includes the design areas 22a, 22b that form the design surface when adhered to the base materials 68a, 68b and the non-design area 23 other than the design areas 22a, 22b, and at least one of the linear cut portions 24a, 24b, 24c, 24d, 24e is formed in the non-design area 23. This feature makes it possible to allow the skin material 20 in the non-design area 23 (i.e., a portion to be cut off later) to stretch while suppressing stretch of the skin material 20 in the design areas 22a, 22b when the sheet material 2 is to be adhered to the base materials 68a, 68b, thereby enabling the sheet material 2 to be adhered to the base materials 68a, 68b having a three-dimensional shape while maintaining the aesthetic appearance of the skin material 20.

(4) In the present embodiment, the stretchable material 25 has lower air permeability than the skin material 20. Due to this feature, the air tightness between the stretchable material 25 and the base materials 68a, 68b can be improved, thereby enabling vacuum forming to be used to adhere the sheet material 2 to the base materials 68a, 68b.

(5) In the forming method, the sheet material 2 is adhered to the base materials 68a, 68b by way of the disposing step of disposing, between the lower die 60 and the upper die 61, the gripping device 3 by which the sheet material 2 is gripped, the approaching step of causing the gripping device 3 to approach the lower die 60, and the forming step of clamping the lower die 60 and the upper die 61 together. In the present embodiment, the sheet material 2 is used which has a multilayer structure in which the skin material 20 and the stretchable material 25 are laminated as described above and in which at least two grippable areas 27a to 27d facing each other are formed in the stretchable material 25. In the disposing step and the approaching step, the sheet material 2 is brought into contact with the base materials 68a, 68b while being gripped at at least two grippable areas 27a to 27d facing each other by the gripping device 3, thereby enabling the sheet material 2 to be adhered to the front surfaces of the base materials 68a, 68b while maintaining the aesthetic appearance of the skin material 20 without applying a large load to the skin material 20 as described above.

(6) In the forming method, the sheet material 2 is used which has a multilayer structure in which the skin material 20 and the stretchable material 25 are laminated as described above and in which the grippable areas 27a to 27d are respectively formed in portions including the four edge sides 26a to 26d of the rectangular shape in plan view. In the disposing step and the approaching step, the sheet material 2 is brought into contact with the base materials 68a, 68b while being gripped at the grippable areas 27a to 27d formed on the entire perimeter of the stretchable material 25 by the gripping device 3, enabling the stretchable material 25 to be uniformly stretched in all directions, whereby the sheet material 2 can be adhered to the front surfaces of the base materials 68a, 68b while maintaining the aesthetic appearance of the skin material 20.

(7) In the forming method, the sheet material 2 is adhered to the base materials 68a, 68b by way of the disposing step of disposing, between the lower die 60 and the upper die 61, the gripping device 3 by which the sheet material 2 is gripped at at least two grippable areas 27a to 27d facing each other, the approaching step of causing the gripping device 3 to approach the lower die, and the forming step of clamping the lower die 60 and the upper die 61 together. In the present embodiment, the sheet material 2 is used in which at least one of the linear cut portions 24a to 24e is formed in the non-design area 23 of the skin material 20. In the disposing step, the gripping device 3 is disposed at such a position that causes, after the approaching step and the forming step, the cut portions 24a to 24e to open on a portion of the lower die 60 where the base materials 68a, 68b are not placed. This feature makes it possible to allow of the skin material 20 to stretch in the non-design area 23 while suppressing stretch of the skin material 20 in the design areas 22a, 22b when the sheet material 2 is to be adhered to the base materials 68a, 68b, thereby enabling the sheet material 2 to be adhered to the base materials having a three-dimensional shape while maintaining the aesthetic appearance of the skin material 20.

(8) In the forming method, the sheet material 2 is adhered to the base materials 68a, 68b by way of the disposing step of disposing, between the lower die 60 and the upper die 61, the gripping device 3 by which the sheet material 2 is gripped at at least two grippable areas 27a to 27d facing each other, the approaching step of causing the gripping device 3 to approach the lower die 60, and the forming step of suctioning air between the die surfaces 60a, 60b of the lower die 60 and the die surfaces 61a, 61b of the upper die 61 while clamping the lower die 60 and the upper die 61 together. In the present embodiment, in the sheet material 2, the stretchable material 25 has lower air permeability than the skin material 20. Due to this feature, in the forming step, the stretchable material 25 and the base materials 68a, 68b can be in close contact with each other by suctioning air between the die surfaces 60a, 60b of the lower die 60 and the die surfaces 61a, 61b of the upper die 61, whereby the sheet material 2 can be uniformly adhered to the front surfaces of the base materials 68a, 68b having a three-dimensional shape.

While one embodiment of the present invention has been described above, the present invention is not limited thereto. Detailed configurations may be changed as appropriate within the scope of the spirit of the present invention.

What is claimed is:

1. A sheet material for forming a design surface of a product by being adhered to a base material having a three-dimensional shape, the sheet material comprising:
   a sheet-like skin material; and
   a sheet-like stretchable material laminated on a rear surface side of the skin material and having higher stretchability than the skin material,
   the stretchable material including grippable areas on which the skin material is not laminated, the grippable areas being respectively provided in portions including at least two edge sides facing each other in plan view.

2. The sheet material according to claim 1, wherein
   the stretchable material has a rectangular shape in plan view, and includes the grippable areas that are respectively provided in portions including four edge sides.

3. The sheet material according to claim 2, wherein
   the skin material includes a design area for forming the design surface and a non-design area other than the design area, and
   at least one linear cut portion is formed in the non-design area.

4. The sheet material according to claim 1, wherein
   the stretchable material has lower air permeability than the skin material.

5. The sheet material according to claim 2, wherein
   the stretchable material has lower air permeability than the skin material.

6. The sheet material according to claim 3, wherein
   the stretchable material has lower air permeability than the skin material.

7. A forming method for forming a product using the sheet material according to claim 1, the forming method comprising:
   a disposing step of disposing a gripping device that grips the sheet material at at least a pair of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and
   a forming step of clamping the lower die and the upper die together.

8. A forming method for forming a product using the sheet material according to claim 2, the forming method comprising:
   a disposing step of disposing a gripping device that grips the sheet material at at least a pair of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and
   a forming step of clamping the lower die and the upper die together.

9. A forming method for forming a product using the sheet material according to claim 3, the forming method comprising:
   a disposing step of disposing a gripping device that grips the sheet material at at least a pair of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and
   a forming step of clamping the lower die and the upper die together.

10. A forming method for forming a product using the sheet material according to claim 4, the forming method comprising:
   the sheet material at at least a pair of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and a forming step of clamping the lower die and the upper die together.

11. A forming method for forming a product using the sheet material according to claim 2, the forming method comprising:
   a disposing step of disposing a gripping device that grips the sheet material at two pairs of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and
   a forming step of clamping the lower die and the upper die together.

12. A forming method for forming a product using the sheet material according to claim 3, the forming method comprising:
   the sheet material at two pairs of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and
   a forming step of clamping the lower die and the upper die together.

13. A forming method for forming a product using the sheet material according to claim 5, the forming method comprising:
   a disposing step of disposing a gripping device that grips the sheet material at two pairs of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and
   a forming step of clamping the lower die and the upper die together.

14. A forming method for forming a product using the sheet material according to claim 3, the forming method comprising:
   the sheet material at at least a pair of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and
   a forming step of clamping the lower die and the upper die together, wherein
   the disposing step includes disposing the gripping device at such a position that causes, after the approaching step and the forming step, the cut portion to open on a portion of the lower die where the base material is not placed.

15. A forming method for forming a product using the sheet material according to claim 6, the forming method comprising:
   a disposing step of disposing a gripping device that grips the sheet material at at least a pair of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and
   a forming step of clamping the lower die and the upper die together, wherein
   the disposing step includes disposing the gripping device at such a position that causes, after the approaching step and the forming step, the cut portion to open on a portion of the lower die where the base material is not placed.

16. A forming method for forming a product using the sheet material according to claim 4, the forming method comprising:
   a disposing step of disposing a gripping device that grips the sheet material at at least a pair of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and
   a vacuum forming step of suctioning air between a die surface of the lower die and a die surface of the upper die while clamping the lower die and the upper die together.

17. A forming method for forming a product using the sheet material according to claim 5, the forming method comprising:
   a disposing step of disposing a gripping device that grips the sheet material at at least a pair of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and
   a vacuum forming step of suctioning air between a die surface of the lower die and a die surface of the upper die while clamping the lower die and the upper die together.

18. A forming method for forming a product using the sheet material according to claim 6, the forming method comprising:
   a disposing step of disposing a gripping device that grips the sheet material at at least a pair of the grippable areas facing each other in plan view between a lower die on which the base material is placed and an upper die that is movable upward and downward relative to the lower die;
   an approaching step of causing the gripping device to approach the lower die to bring the stretchable material into contact with the base material; and
   a vacuum forming step of suctioning air between a die surface of the lower die and a die surface of the upper die while clamping the lower die and the upper die together.

\* \* \* \* \*